(No Model.) 2 Sheets—Sheet 1.

J. H. LINEBARGER.
PLOW.

No. 472,302. Patented Apr. 5, 1892.

Attest:
L. W. Benjamin.
E. C. Grigg.

Inventor:
Jonathan H. Linebarger
by Rea & Worthington
his attys.

THE NORRIS PETERS CO., PHOTO-LITHO., WASHINGTON, D. C.

(No Model.) 2 Sheets—Sheet 2.

J. H. LINEBARGER.
PLOW.

No. 472,302. Patented Apr. 5, 1892.

Attest:
C. W. Benjamin
E. C. Grigg.

Inventor:
Jonathan H. Linebarger
by Read & Worthington
his Attys.

UNITED STATES PATENT OFFICE.

JONATHAN H. LINEBARGER, OF CLARION, IOWA.

PLOW.

SPECIFICATION forming part of Letters Patent No. 472,302, dated April 5, 1892.

Application filed September 3, 1891. Serial No. 404,591. (No model.)

*To all whom it may concern:*

Be it known that I, JONATHAN H. LINEBARGER, a citizen of the United States, residing at Clarion, in the county of Wright and State of Iowa, have invented certain new and useful Improvements in Plows; and I do hereby declare the following to be a full, clear, and exact description of the invention, such as will enable others skilled in the art to which it appertains to make and use the same.

This invention relates to plows. As ordinarily constructed the draw-bars and the plows are rigidly fixed to the same frame, which results in an irregularity in the line of draft when moving over soil not uniform in character or in moving over rough or uneven ground. I obviate this difficulty by mounting the draw-bars pivotally with relation to the plows and fixing them thereto at a point about on a line with the line of resistance, thus enabling the draft to be always in the same direction.

My invention also involves means for varying the depth of cut of the plows and also involves an improved cutter for turning sod in tough ground.

The specific features of invention will be hereinafter more fully described, and then definitely indicated in the appended claims.

Figure 1:
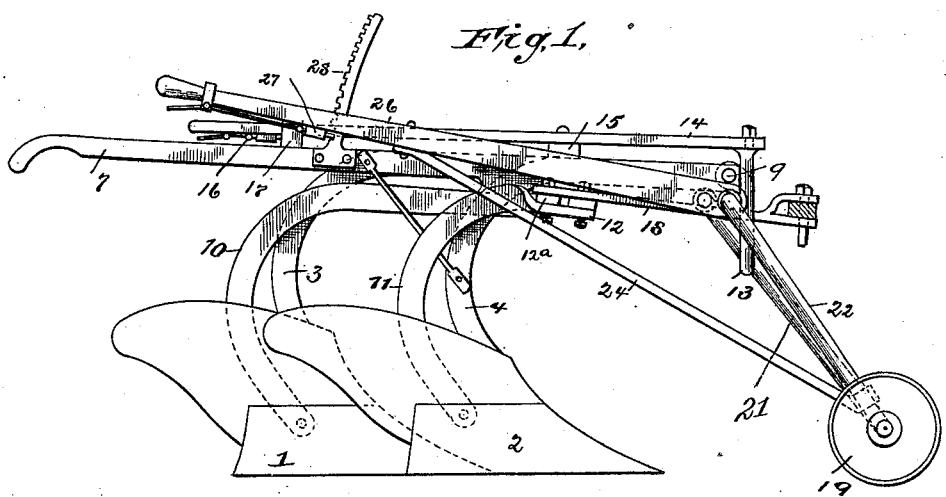
Figure 2:
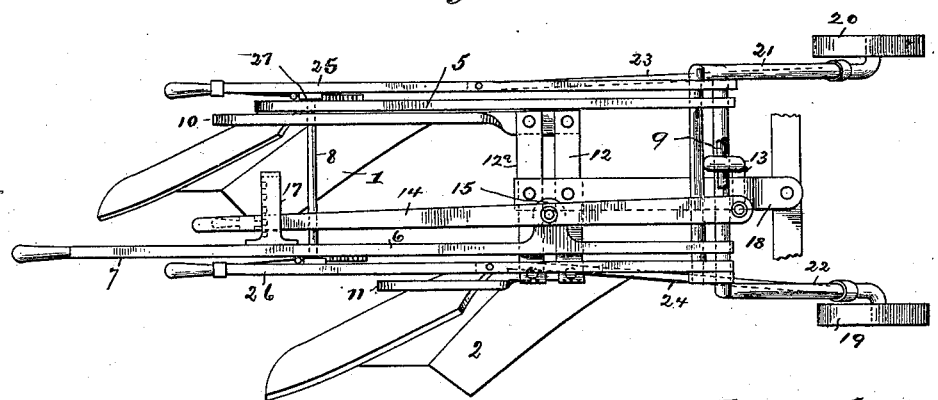
Figure 3:
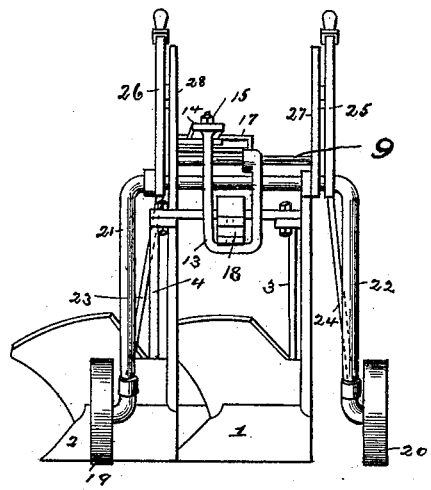
Figure 5:
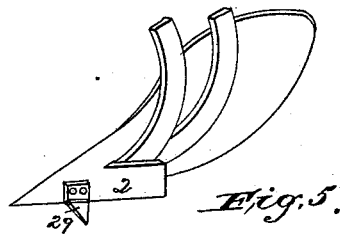
Figure 4:
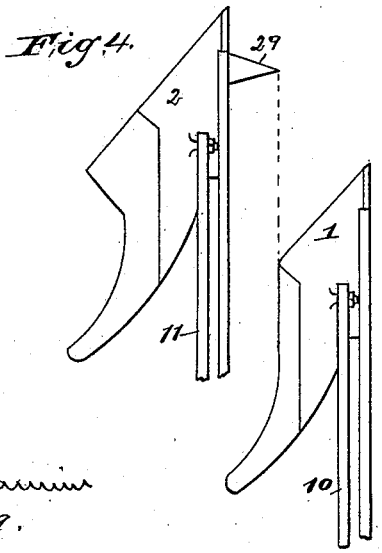

In the accompanying drawings, which illustrate this invention, Figure 1 is a side elevation of a double plow involving my invention. Fig. 2 is a plan. Fig. 3 is a front elevation. Fig. 4 is a detail view showing the improved cutter applied to one of the plows, and Fig. 5 is a side elevation of a plow with the cutter affixed thereto.

The plows 1 2 are rigidly fixed to a pair of beams 3 4, secured to side bars 5 6, to one of which the handle 7 is fixed. The beams and bars are fastened together by braces 8 9, making of the whole a rigid structure. The draw-beams 10 11, to which the doubletrees are attached, are curved and extend behind the mold-boards of the plows and are pivotally connected to the plowshare by means of a bolt, the connection being a loose one, so that the draw-beams will be capable of a vertical or lateral play. (See Fig. 4.) The point of connection is about two inches above the bottom of the plow and about one-third the distance from the landside to the edge of the plowshare, so that the pull of the horses takes off all the pressure from the landside. The draw-beams are connected to two cross-bars 12 12$^a$, each being held by a single bolt through each cross-bar, the bolts being loose to permit the beams to rise and fall when the plow passes over uneven ground. A bar 18 connects the cross-bars with the doubletree and passes through a yoke 13, controlled by a lever 14, pivotally mounted at 15 to the fixed frame. This yoke is capable of being slid back or forth laterally upon the frame, so that the operator can regulate the direction of draft from the rear of the plow. For that purpose the lever is extended within reach of the operator and is provided with a latch 16, which may engage in one of a series of notches in a rack 17, secured to the frame and extending laterally in the path of movement of the lever 14. The beams of the two plows are of uneven length, one being from twelve to eighteen inches longer than the other, and the plows so mounted that the landside of the rear plow extends as far rearwardly as the end of its share, while the landside of the front plow is from two to four inches shorter. The wheels 19 20 are mounted upon axles which are bent upwardly at right angles and then extend horizontally through bearings in the frame, forming independent spindles which permit the wheels to be independently adjusted. (See Figs. 1 and 2.) The upwardly-extending arms 21 22 are braced by rods 23 24, secured to the arms at one end and bolted to levers 25 26 at the other end. These levers extend rearwardly to a point within reach of the operator and are provided with detents, as 27, which lock them in any desired position of adjustment by entering a notch in a curved rack 28, secured to the side bar. By lowering or raising the lever 25 or 26 the wheels are more or less inclined from a perpendicular and the frame of the plow is lowered in or raised from the ground, and thus varies the depth of cut. The levers are independent, one being provided for each wheel, which permits of either being raised so as to pass over any obstruction when necessity arises. It also permits of a relative adjustment of the depth of cut of the two plows, or permits one to be kept out of action entirely—features which adapt the implement particularly for side-hill plowing. For breaking sod in tough land I put a cutter on the bottom bar of the front plow and remove the plowshare from the rear plow, so that the latter will cut to a line with the edge of the knife. This cutter is shown in position at 29 in Fig. 4, where it will be seen that it cuts and loosens the sod, thus serving to reduce the pressure on the landside of the plow.

Having thus described my invention, what I claim as new, and desire to secure by Letters Patent, is—

1. In a double wheel-plow, the combination, with the main frame and one or more plows fixed thereto, of two wheels mounted on adjustable axes, and levers for independently raising or lowering the axes, so as to vary the depth of cut or raise the plow out of action.

2. In a plow, the combination, with the main frame and one or more plows fixed thereto, of wheels mounted upon independent vertically-adjustable axes, levers for independently adjusting the axes, each lever being within reach of the operator while plowing, and means for locking either wheel in any desired position of adjustment.

3. In a plow, the combination, with the main frame and plows fixed thereto, of draw-bars pivotally connected to the plows in or near the line of cutting, a lever for shifting the draw-bars laterally, so as to change the line of draft, and means for locking the lever in any desired position of adjustment.

4. The combination, with a wheel-plow, of plow-beams 3 4 to which the plows are rigidly connected, and draw-beams pivotally connected to the plows near the line of cutting.

5. The combination, with a wheel-plow having the plows rigidly secured to the main frame, of draw-beams pivotally connected to the plows and a loose connection between the draw-bar and beams, so as to permit of vertical play between draw-bar and draw-beams.

In testimony whereof I affix my signature in presence of two witnesses.

JONATHAN H. LINEBARGER.

Witnesses:
NELS JACOBSON,
J. A. ROGERS.